United States Patent
Nimphius

(10) Patent No.: US 6,496,570 B1
(45) Date of Patent: Dec. 17, 2002

(54) METHOD AND COMMUNICATION NETWORK FOR OFFERING ANNOUNCEMENTS

(75) Inventor: Klaus Nimphius, Pullach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/367,961

(22) PCT Filed: Feb. 11, 1998

(86) PCT No.: PCT/DE98/00377

§ 371 (c)(1),
(2), (4) Date: Aug. 23, 1999

(87) PCT Pub. No.: WO98/37716

PCT Pub. Date: Aug. 27, 1998

(30) Foreign Application Priority Data

Feb. 21, 1997 (DE) .......................... 197 07 060

(51) Int. Cl.⁷ .................. H04M 1/64; H04M 7/00
(52) U.S. Cl. .............. 379/88.25; 379/67.1; 379/68; 379/88.05; 379/88.16; 379/88.18; 379/219; 379/221; 379/221.11
(58) Field of Search .............. 379/67.1, 68, 88.17, 379/88.22, 88.25, 201.01, 201.02, 207.13, 210.02, 219, 220.01, 221.01, 88.05, 88.06, 821.08, 221.09, 88.16, 88.18, 221.11

(56) References Cited

U.S. PATENT DOCUMENTS

| | | | | |
|---|---|---|---|---|
| 5,255,183 A | | 10/1993 | Katz ........................... 705/30 |
| 5,353,335 A | * | 10/1994 | D'Urso et al. ............. 379/67.1 |
| 5,524,146 A | | 6/1996 | Morrisey et al. ........... 379/207 |
| 5,526,413 A | | 6/1996 | Cheston, III et al. ....... 379/201 |
| 5,583,920 A | * | 12/1996 | Wheeler, Jr. .................. 379/88 |
| 5,586,171 A | * | 12/1996 | McAllister et al. ........ 379/67.1 |
| 5,592,535 A | | 1/1997 | Klotz .......................... 455/406 |
| 5,594,789 A | | 1/1997 | Seazholtz et al. ........... 379/207 |
| 5,594,791 A | * | 1/1997 | Sziam et al. ................. 379/265 |
| 5,703,935 A | * | 12/1997 | Raissyan et al. .............. 379/88 |
| 5,835,568 A | * | 11/1998 | Bass et al. ................. 379/67.1 |
| 5,933,490 A | * | 8/1999 | White et al. ................ 379/221 |
| 6,014,379 A | * | 1/2000 | White et al. ................ 370/389 |

FOREIGN PATENT DOCUMENTS

WO    WO 96/13927    5/1996

OTHER PUBLICATIONS

Voice services on the intelligent network: intelligent peripherals and service nodes, Bosco, pp. 347–353.

* cited by examiner

*Primary Examiner*—Allan Hoosain
(74) *Attorney, Agent, or Firm*—Bell, Boyd & Lloyd LLC

(57) ABSTRACT

A method and communication network wherein one or more announcement texts are established in a service control point. A message initiated on the basis of a call of the subscriber wherein information about the supportability of announcements by an announcement unit are contained is received and interpreted by the service control point. Given support of an announcement by an announcement unit, a message in which the announcement text is contained is sent from the service control point. The announcement unit converts a received announcement text into an announcement that is then transmitted to the calling subscriber on a voice channel.

12 Claims, 3 Drawing Sheets

METHOD AND COMMUNICATION NETWORK FOR OFFERING ANNOUNCEMENTS

BACKGROUND OF THE INVENTION

Field of the Invention

The present invention relates to the support of additional services for subscribers of a communication network, such as a fixed network or a mobile radio telephone network, through the use of an intelligent network with service control points.

Communication networks, for example fixed networks or mobile radio telephone networks constructed in the fashion of the known GSM mobile radio telephone network (global system for mobile communications), include switching equipment networked with another. Respective base stations, with whose assistance communication terminals can be connected via an air interface, are connected to the switching equipment in the mobile radio telephone network. In the fixed network, the communication terminal equipment is connected to the switching equipment via lines. The communication terminal equipment thus enables a subscriber to have network access independently of the network type. The switching equipment, over and above this, can effect a transition to further networks, for example data transmission networks, fixed networks or mobile radio telephone networks. In the GSM mobile radio telephone network, memory units wherein, among other things, subscriber-specific data for network-proper services are stored, are employed. One of these memory units is the home register that is usually located at a permanently defined location wherein the data underlying the registration of the subscriber is deposited. Dependent on the momentary location of the mobile subscriber, at least one further memory unit-the visitor register-is responsible. Dependent on the location of the mobile subscriber, the responsibility of determining which memory unit, having specific data stored for this subscriber, is to surface can change via the subscriber.

It is well known to support additional services for the subscribers of a communication network either a fixed network or mobile radio telephone network, by the structure of an intelligent network with service control points. These service control points and the profiles of the additional services deposited therein, including the information needed for their implementation can be modified independently of the respective communication network. The services useable in an intelligent network are thereby initiated in a service switching point in order to effect a departure from the standard call processing and activate the access to the additional services. One of such services is that of making one or more announcements available to the subscriber of the communication network. This is achieved in that the announcement is initiated by a service switching point and is implemented by an announcement unit connected thereto (intelligent peripheral). The selection of the announcement occurs with a service control point via an INAP signaling (intelligent network application part). What is disadvantageous about the method is that all announcements must be pre-defined in the announcement unit; i.e., the announcements proceeding must be previously registered and loaded into the announcement unit. This procedure is inflexible with respect to offering and producing new announcements, since these must be registered "offline" and stored in the announcement unit before use thereof is possible. Over and above this, an announcement identification, for example with an announcement telephone number, must be offered and signaled for the selection of the respective announcement. The corresponding announcement identifications are to be declared between the service control point and service switching point in order to be able to use the new announcements.

U.S. Pat. No. 5,592,535 discloses a method and arrangement for billing call connections upon utilization of the equipment of an intelligent network. The mobile subscriber of a mobile radiotelephone network thereby has a credit account whose current line of credit is compared to a prescribable minimum threshold given a call by the subscriber. The implementation of the call connection only occurs when the credit line lies above this threshold. By involving the equipment of the intelligent network, the appertaining INAP protocol (Intelligent Network Application Protocol) can be applied instead of the MAP protocol (Mobile Application Protocol).

U.S. Pat. No. 5,594,789 discloses a multimedia communication system with equipment of an intelligent network whereof an intelligent system means includes a speech recognition unit as well as a speech verification unit. The multimedia system utilizes the speech recognition and speech verification for connection control and, in particular, for the implementation of a transaction, whereby the service control point includes a specific database for the identification of a speech sample which a subscriber inputs into a terminal or into a telephone for authentification purposes. When the comparison of the speech sample to an entry stored in the database yields identity, the transaction is implemented. "The CAMEL feature, proposed revisions to the stage 1 description" of ETSI/STC/SMG1, Mar. 14, 1995, GSM 02.78, Version 0.4.0, pages 1 through 14, discloses a CAMEL (customized application for mobile network enhanced logic) platform with which the support of additional vendor-specific services should be enabled for subscribers, for example, even when they are residing abroad. An operator-specific, additional service thus can be used beyond network and service boundaries of a communication network. This is the case when the service switching unit initiating the additional service can process the required CAP signaling (CAMEL application part) for the requested service and when signaling information from and to the home register and to the service control unit of the additional service can be exchanged beyond the network boundaries. What this means for the announcement is that, when a mobile subscriber resides in a network other than the home network, the announcements of all other networks must be known there and must be unambiguously identifiable. This incurs a high handshaking outlay that must occur across network boundaries and that is relatively. A solution via "rerouting" from the network in which the subscriber resides to his home network in order to set up the announcement there would lead to an additional occupation of lines and, thus, would require additional transmission resources.

The present invention is therefore directed to an optimally flexible method and a corresponding communication network for offering announcements for the subscribers.

SUMMARY OF THE INVENTION

The inventive method for offering announcements therefore provides that one or more announcement texts are established in a service control point. A message initiated on the basis of a call by a subscriber, wherein information about the supportability of announcements by an announcement unit are contained, is received and interpreted by the service control point. Given the support of an announcement by an announcement unit, a message in which the announcement text is contained is sent from the service control point to the announcement unit. The announcement unit converts the received announcement text into an announcement that is then transmitted to the calling subscriber on a voice channel.

The advantage of the inventive method is that only the announcement texts are introduced in a service control point—that is usually arranged at a center location—and the announcements themselves are set up by the announcement units by converting the received announcement texts. The central storing of announcement texts avoids a complicated handshaking of the announcements between service control point and service switching point or respectively, announcement unit via a corresponding signaling. Further, it enables a fast and flexible adaptation of announcement unit via a corresponding signaling and enables a fast and flexible adaptation of announcements to new services and service expansions. The enhanced flexibility leads to cost-savings since the announcement units no longer are to be reloaded given every change or addition of an announcement. The offering of the announcements also occurs independent of location without the announcements having to be previously pre-defined in the respective announcement units. The outlay for introducing new announcements is, thus, substantially reduced. Offering the announcements according to the CAMEL platform for a "roaming" subscriber beyond network boundaries is significantly simpler due to the inventive procedure—less outlay for signaling and line occupancy. The announcements are made available to the subscriber on site both in his own network as well as in an outside network, for example, abroad, by simply converting the received announcement texts. The advantage for him is that the announcements are recorded in a language he can understand, preferably in his native language.

The inventive method can be applied to fixed networks as well as mobile radio telephone networks given that the announcement is played for the calling subscriber via a voice channel controlled by a service control point and supported by an announcement unit. Another advantage of the inventive method is that one is able to transmit the information about the supportability of announcements and the announcement text or texts in messages that are part of the IANP or, respectively, CAP signaling. This means that no outlay for additional lines or signaling messages is required for the inventive method.

The communication network according to the present invention is characterized in that one or more announcement texts are established in the service control point. A message initiated due to a call of the subscriber, wherein information about the supportability of announcements by an announcement unit are contained, is received and evaluated by the service control point. When an announcement is supported by an announcement unit, a message wherein the announcement text is contained is sent from the service control point to the announcement unit. The announcement unit converts a received announcement text into an announcement that is then transmitted to the calling subscriber on a voice channel.

A service control point for supporting the present invention includes means for storing one or more announcement texts as well as means for storing and evaluating a message initiated on the basis of a call of the subscriber wherein information about the supportability of announcements by an announcement unit are contained. Over and above this, the service switching point is provided with means for transmitting a message wherein the announcement text is transmitted to an announcement unit supporting the announcement, the received announcement text being converted into an announcement by the latter, this announcement then being transmitted to the calling subscriber on a voice channel via a service switching point.

A service switching point for supporting of the present invention includes means for the reception of the message wherein the announcement text is contained and further includes means for transmitting the announcement text to an announcement unit that supports the announcement. The received announcement text is then converted by the announcement unit into an announcement that is transmitted to the calling subscriber on a voice channel via a service switching point.

An announcement unit for supporting the present invention includes means for the reception of the message wherein an announcement text is contained and further includes means for converting the announcement text into an announcement that is then transmitted to the calling subscriber on a voice channel via a service switching point.

Additional features and advantages of the present invention are described in, and will be apparent from, the Detailed Description of the Preferred Embodiments and the Drawing.

DETAILED DESCRIPTION OF THE PREFERRED EMBODIMENTS

The communication network and method according to the present invention shall be explained with reference to the example of a mobile radio telephone network according to FIG. 1 that is operated according to the GSM standard. The present invention is not limited to mobile networks but likewise can be employed in fixed networks. The communication network KN usually includes a plurality of pieces of switching equipment MSC/VLR that are connected to one another. Switching equipment MSC/VLR sets up the connection to a mobile subscriber via base station BS, which is connected to the switching equipment VLR/MSC in linebound fashion, and via an air interface between base station BS and a mobile station MS. The mobile station MS is the communication terminal equipment of a mobile subscriber A who initiates a call to a destination subscriber in the examples described below (MOC, mobile originated call). Further switching equipment (which is not shown) forms the network interworking into a further network, for example, a fixed network.

Figure 4:
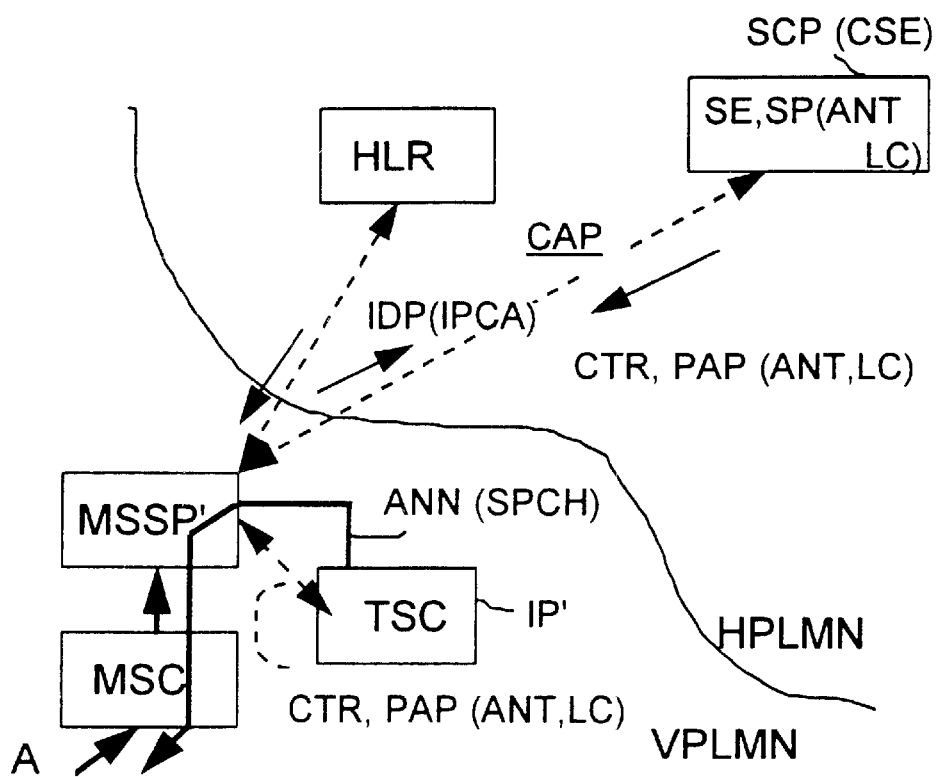
FIG. 4 shows a schematic illustration of a network-overlapping message flow for offering announcements for a mobile subscriber not located in the subscribers home network.

The communication network KN also contains service control points SCP (also refer according to CAMEL phase 1 as CSE-CAMEL service environment, also see FIG. 4) and service switching points SSP, A-SSP for supporting the network structure of an intelligent network. The switching equipment MSC/VLR connected to the base station BS includes the service switching point SSP as sub-system, whereas the other switching equipment MSC/VLR has the service switching point A-SSP allocated to it. Given these connections, it is not necessary that each service control point SCP be directly connected to every piece of switching equipment MSC/VLR or service switching point SSP, A-SSP. It suffices when these can be reached via a number 7 signaling via the communication network KN or other networks. In the present example, a service control point SCP lies in the communication network KN and is directly connected to the service switching points SSP and A-SSP via the INAP signaling, whereas another service control point SCP is arranged in a visitor network VPLMN of the international GSM mobile radio telephone network and is only directly connected to the service switching point SSP via the SAP signaling (see FIG. 4).

Figure 1:
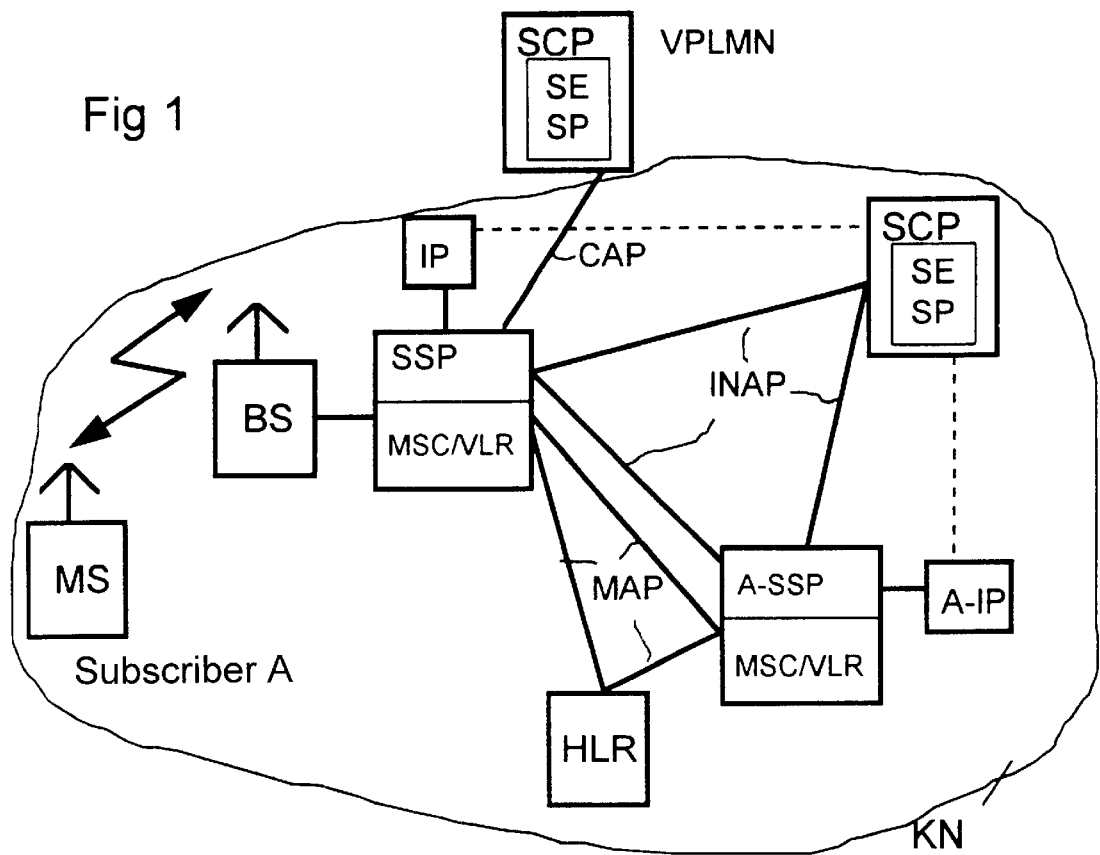
FIG. 1 shows a block circuit diagram of a communication network in accordance with the teachings of the present invention.

According to FIG. 1, announcement units IP, A-IP for setting up variable announcements for the subscribers of the communication network KN are connected to the service switching points SSP, A-SSP. They are driven by the service control point SSP either directly or via the respective service switching point SSP, A-SSP with the INAP signaling. At least one memory unit HLR is arranged as home register of the mobile subscriber A in the communication network KN and is connected to the two pieces of switching equipment MSC/VLR that are shown here by way of example. The pieces of switching equipment MSC/VLR thereby have a respective visitor register VLR allocated to them wherein the mobile subscriber is registered for the duration of his residency in the coverage area of this switching equipment. The communication of the home register with the switching equipment MSC/VLR occurs via the MAP signaling (mobile application part).

Call setup messages outgoing from the mobile subscriber A are processed first in the switching equipment VLR/MSC in whose coverage area the mobile subscriber A is located. The interrogation of services is to be initiated there, particularly the auxiliary services and vendor/specific auxiliary services. The memory units HLR, VLR contain information about additional services that can be used by the subscriber A, whereby information about the additional services proceed into the visitor register VLR via a "location update". This additional information is thereby allocated to a subscriber with the subscriber data of a subscriber; for example, in table form. For the present example, the service includes offering announcements for the calling mobile subscriber A. The flexible and location-independent control and utilization of the announcements shall be explained with reference to the other FIGS.

Figure 2:
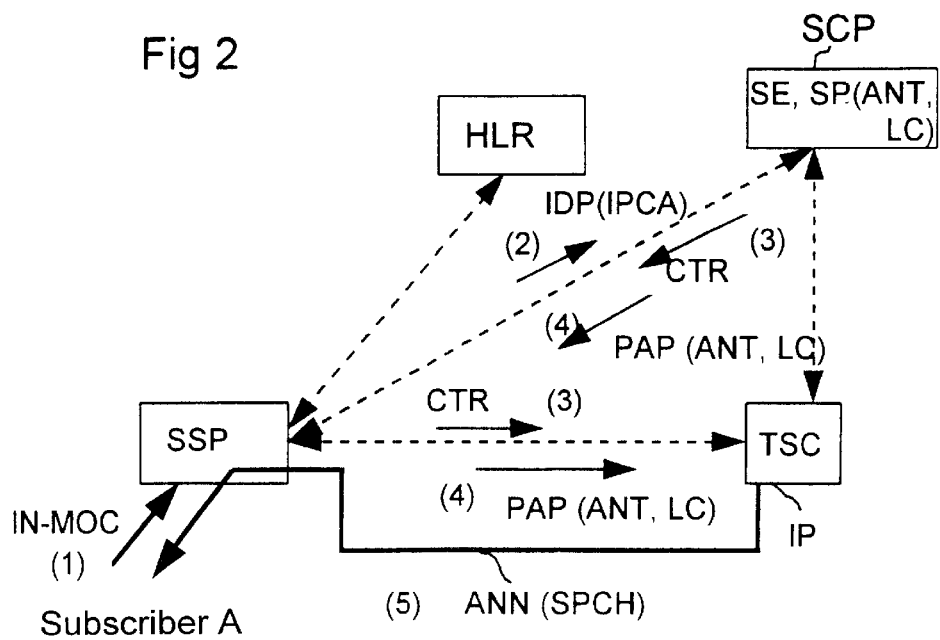
FIG. 2 shows a schematic illustration of the message flow for offering announcements with a service control point and a service switching point.
Figure 3:
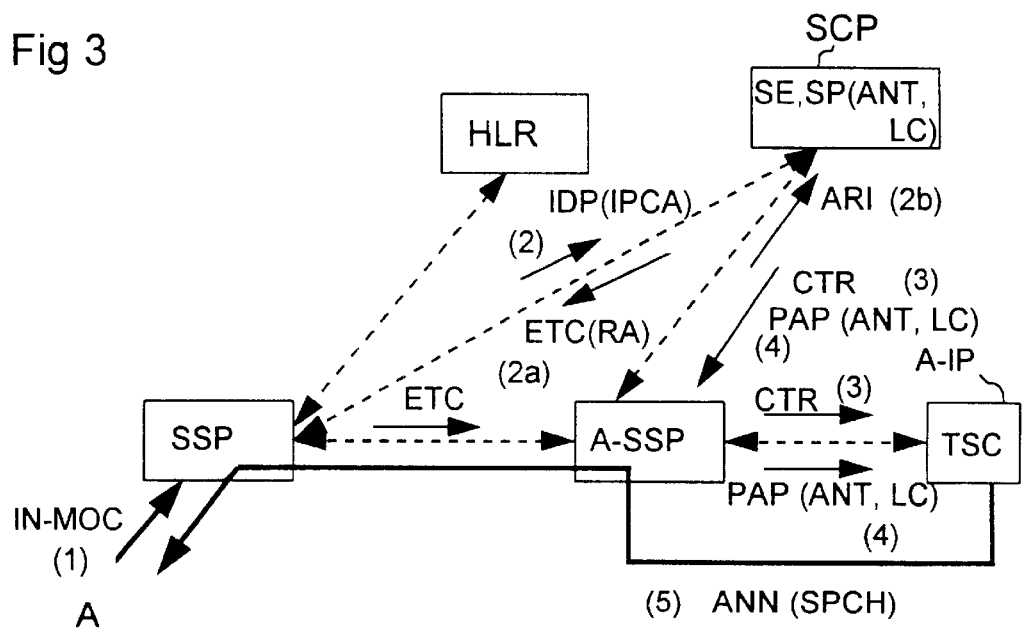
FIG. 3 shows a schematic illustration of the message flow for offering announcements with a service control point and two service switching points.

FIGS. 2 through 4 show basic configurations for the execution of the inventive method. In FIG. 2, subscriber data from the home register HLR is transmitted upon employment of the MAP protocol into the visitor register VLR at the service switching point SSP during a location update LUP. When the subscriber A for outgoing calls is registered for additional services, subscriber information with respect thereto is additionally transmitted and stored in the visitor register VLR. Upon initiation of an outgoing call by the subscriber A, an evaluation with respect thereto occurs by the service switching point SSP.

The present example is a matter of an outgoing call IN-MOC of the subscriber A, whereby a call setup message proceeds (1) to the service switching point SSP via the switching equipment responsible for him. The service switching point SSP has devices available for evaluating the message and for transmitting an initiating message IDP (initial detection point) to the service control point SCP via the INAP protocol (2). Information IPCA (intelligent peripheral capabilities) are contained in the message IDP that indicate what properties are present with respect to the announcements such as, for example, language, scope of language, etc., in the announcement unit IP in communication with the service switching point SSP. The information IPCA received in the service control point SCP in view of the supportability of announcements are interpreted by a means SE. which, for example, can occur on the basis of a comparison to requests deposited in table form. Given adequate support by the service switching point SSP or, respectively, announcement unit IP, the service control point SCP returns a message CTR (connect to resource) back with which the permission to select the announcement unit IP is signaled to the service switching point SSP. Upon reception of the message CTR in the service switching point SSP, the announcement unit IP is immediately connected; symbolically illustrated in FIG. 2 by the transmission of the message CTR to the announcement unit IP (3).

The service control point SCP also has equipment SP available for storing announcement texts ANT that, for example, are configured in the form of ASCII texts. Further information LC for identifying national language properties of the announcement thereby can be stored for the announcement text ANT. This information LC, thus, includes one or more country codes for the identification of the language in which the announcement of the received announcement text should occur by the announcement unit. The announcement texts ANT and the aforementioned information can, for example, be established at a central location by a higher-ranking control and administration system (service management point or operation and maintenance center) on the basis of signaling in the service control point SCP. As soon as the means SE in conjunction with the means SP has selected the announcement text or texts ANT, they are preferably transmitted with the information LC in a message PAP (play announcement or prompt and collect), are received by the service switching point SSP and are forwarded thereat to the announcement unit IP (4). Alternatively, it is possible to also directly exchange the message PAP with the described information between service switching point SCP and announcement unit IP.

The announcement unit IP includes a means TSC for converting the received announcement text ANT into an announcement ANN. This, for example, can occur with a text-audio converter that implements the conversion of the text into language, potentially taking the additionally received information LC into consideration. The announcement ANN generated in this way is transmitted (5) from the announcement unit IP connected to the service switching point SSP to the subscriber A via the voice channel SPCH connected in the switching equipment.

FIG. 3 shows a slightly modified configuration compared to FIG. 2 since a further service switching point A-SSP (assisting service switching point) has been added. The message transmission according to steps (1) and (2) is identical to FIG. 2. In contrast to what was described above, the check of the information IPCA in the means SE of the service control point SCP shows that no adequate support is established by the announcement unit connected to the service switching point. The service switching point SCP therefore sends a message ETC (established temporary connection) with which a request is made to set up a temporary signaling connection and voice connection with a service switching point suitable for supporting the announcements. This other service switching point in the illustrated example is the service switching point A-SSP that is informed (2a) of the original service switching point SSP by a routing address RAD contained in the message ETC. Over and above this, the service switching point A-SSP is also to be looped into the voice channel connection to the subscriber. The selected service switching point A-SSP sends a message ARI (assisted request instruction) to the service control point SCP in order to inform this of the communication partner for offering the announcement (2b).

Subsequently, the service control point SCP, corresponding to the procedure in FIG. 2, successively sends the messages CTR and PAP, on which the announcement text ANT and the information LCR are contained, to what is now the applicable service switching point A-SSP that forwards the received messages CTR and PAP to the respectively appertaining announcement unit A-IP (3, 4). The conversion of the received announcement text ANT into language occurs with the means TSC. The announcement ANN determined in this way is transmitted to the subscriber A(5) by the announcement A-IP via the voice channel SPCH that is connected in the switching equipment allocated to the two service switching points A-SSP and SSP.

FIG. 4 describes the case wherein the subscriber A is not residing in his home network HPLMN but in an outside network; the visitor network VPLMN. According to the CAMEL platform, a communication beyond the boundary of two networks HPLMN, VPLMN is possible for making use of services. The call setup again proceeds from the mobile subscriber A via his communication terminal equipment. The connection setup message reaches the switching equipment MSC of the outside network VPLMN currently responsible for him and in whose coverage area the mobile station of the subscriber is located. The service switching point SSP' allocated to the switching equipment MSC sends the message IDP with the information IPCA that is transmitted in network-overlapping fashion to the service control point SCP with the equipment SE and SP by CAP signaling. In the same way as in FIG. 2, the messages CTR, PAP with the announcement texts ANT and the information LC subsequently are produced and exchanged between the service control point SCP, the service switching point SSP' and an appertaining announcement unit IP'. In addition to the constellation of FIG. 2, the message flow occurs across the network boundary of the two networks HPLMN and VPLMN. A means TSC' for text-language conversion in the announcement unit IP' supplies the announcement ANN that is played to the subscriber via the service switching point on the voice channel SPCH in the visitor network VPLMN that has been connected in the switching equipment MSC. In this way, the subscribers "roaming" in outside networks can be offered the announcements in their native language or at least in a language that they understand, being offered flexibly and without additional signaling load or line occupation.

Although the present invention has been described with reference to specific embodiments, those of skill in the art will recognize that changes may be made thereto without departing from the spirit and scope of the invention as set forth in the hereafter appended claims.

I claim:

1. A method for offering announcements in a communication network, the method comprising the steps of:
   providing network switching equipment;
   providing communication terminal equipment which is connectable to the network switching equipment;
   enabling both access of subscribers to the communication network and transitions to at least one further network via the communication terminal;
   controlling the announcements via at least one service control point;
   offering the announcements for a calling subscriber via at least one service switching point; the service switching point being connectable to an announcement unit;
   establishing at least one announcement text in the service control point;
   receiving and interpreting by the service control point a first message initiated on the basis of a call of the calling subscriber, the first message containing information on the supportability of announcements by the announcement unit;
   determining support of an announcement by the announcement unit;
   transmitting a second message from the service control point to the announcement unit if the announcement unit supports the announcement, the second message containing the at least one announcement text and additional language information for identifying national language properties of the announcement, wherein the additional language information includes at least a language code for identifying a language in which the announcement of the received announcement text occurs via the announcement unit;
   converting the announcement text into the announcement at the announcement unit; and
   transmitting the announcement via the announcement unit to the calling subscriber on a voice channel.

2. A method for offering announcements in a communication network as claimed in claim 1, further comprising the steps of:
   generating the first message by a first service switching point servicing the calling subscriber; and
   transmitting the first message to the service control point.

3. A method for offering announcements in a communication network as claimed in claim 2, further comprising the step of:
   routing the second message via the first service switching point to the announcement unit.

4. A method for offering announcements in a communication network as claimed in claim 2, further comprising the step of:
   selecting a second service switching point with the service control point via which the second message is routed to another announcement unit connected to the second service switching point.

5. A method for offering announcements in a communication network as claimed in claim 2, wherein the second message is directly sent from the service control point to the announcement unit.

6. A method for offering announcements in a communication network as claimed in claim 1, wherein the communication network is a mobile radio telephone network.

7. A method for offering announcements in a communication network as claimed in claim 6, wherein the service switching point and the service control point belong to spatially separate communication networks.

8. A method for offering announcements in a communication network as claimed in claim 6, wherein, given a call of the calling subscriber that is residing in a visitor network and not in the calling subscribers home network, the first message is transmitted to the service control point in the home network and the second message is transmitted to a service switching point in the visitor network in network-overlapping fashion, and wherein the announcement is generated by an announcement unit in the visitor network.

9. A communication network for offering announcements, comprising:

network switching equipment;

communication terminal equipment connectable to the network switching equipment, the communication terminal equipment enabling both access of subscribers to the communication network and transitions to at least one further network via the communication terminal equipment;

at least one service control point for controlling the announcements, the service control point storing at least one announcement text, the service control point further receiving and interpreting a first message initiated on the basis of a call of a calling subscriber which includes information on the supportability of announcements by an announcement unit, the service control point also transmitting a second message to the announcement unit if the announcement unit supports an announcement, the second message containing the at least one announcement text and additional language information for identifying national language properties of the announcement, wherein the additional language information includes at least a language code for identifying a language in which the announcement of the received announcement text occurs via the announcement unit;

at least one service switching point connectable to the announcement unit for offering announcements for the calling subscriber; and an announcement unit for converting the received announcement text into the announcement and for transmitting the announcement to the calling subscriber on a voice channel.

10. A communication network for offering announcements as claimed in claim 9, wherein the service control point further comprises:

means for storing the at least one announcement text;

means for storing and evaluating the first message; and means for sending the second message to the announcement unit.

11. A communication network for offering announcements as claimed in claim 9, wherein the service switching point further comprises:

means for receiving the second message from the service control point; and means for sending the announcement text to the announcement unit.

12. A communication network for offering announcements as claimed in claim 9, wherein the announcement unit further comprises:

means for receiving the second message; and means for converting the announcement text in the announcement.

* * * * *